UNITED STATES PATENT OFFICE.

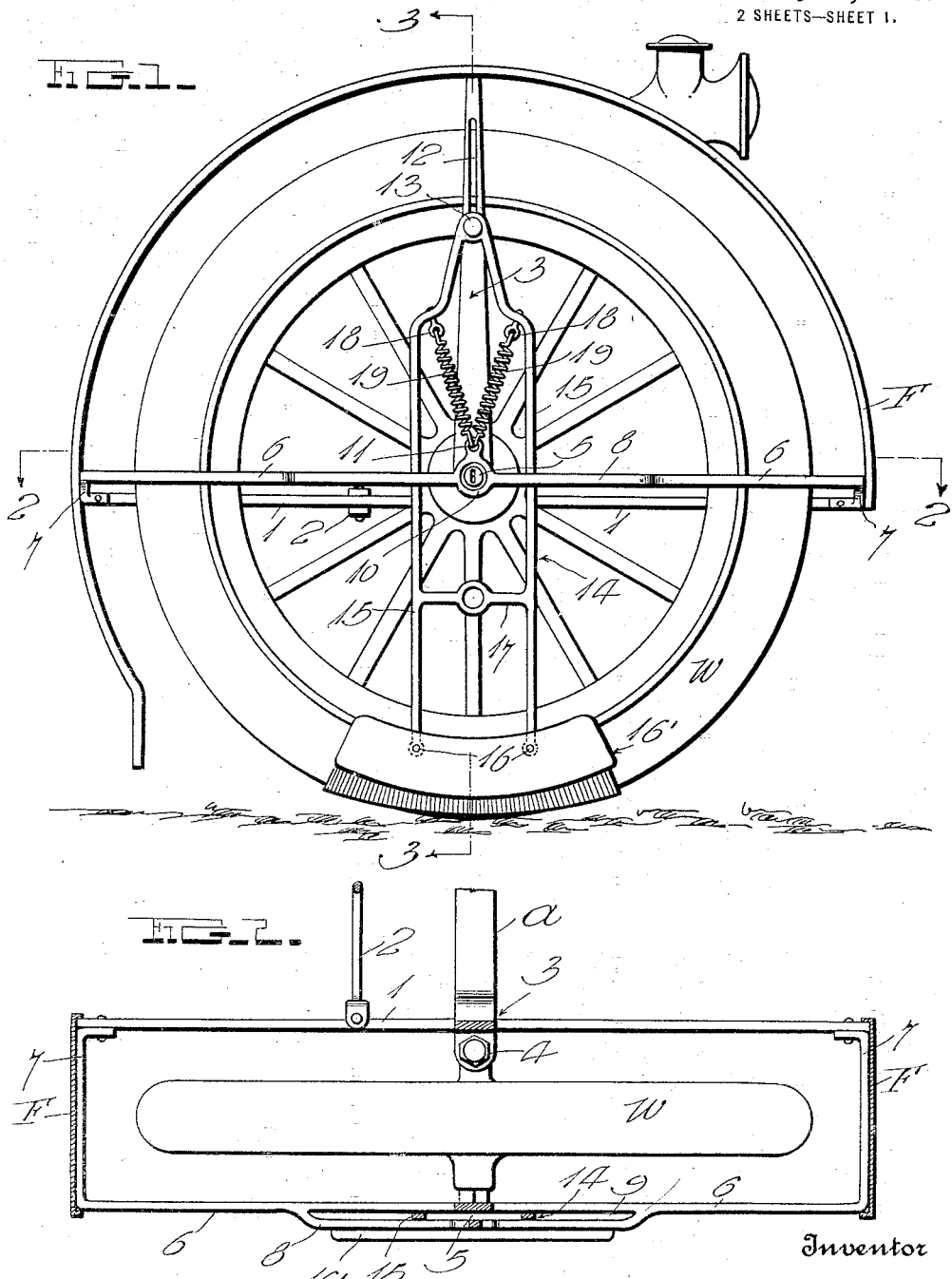

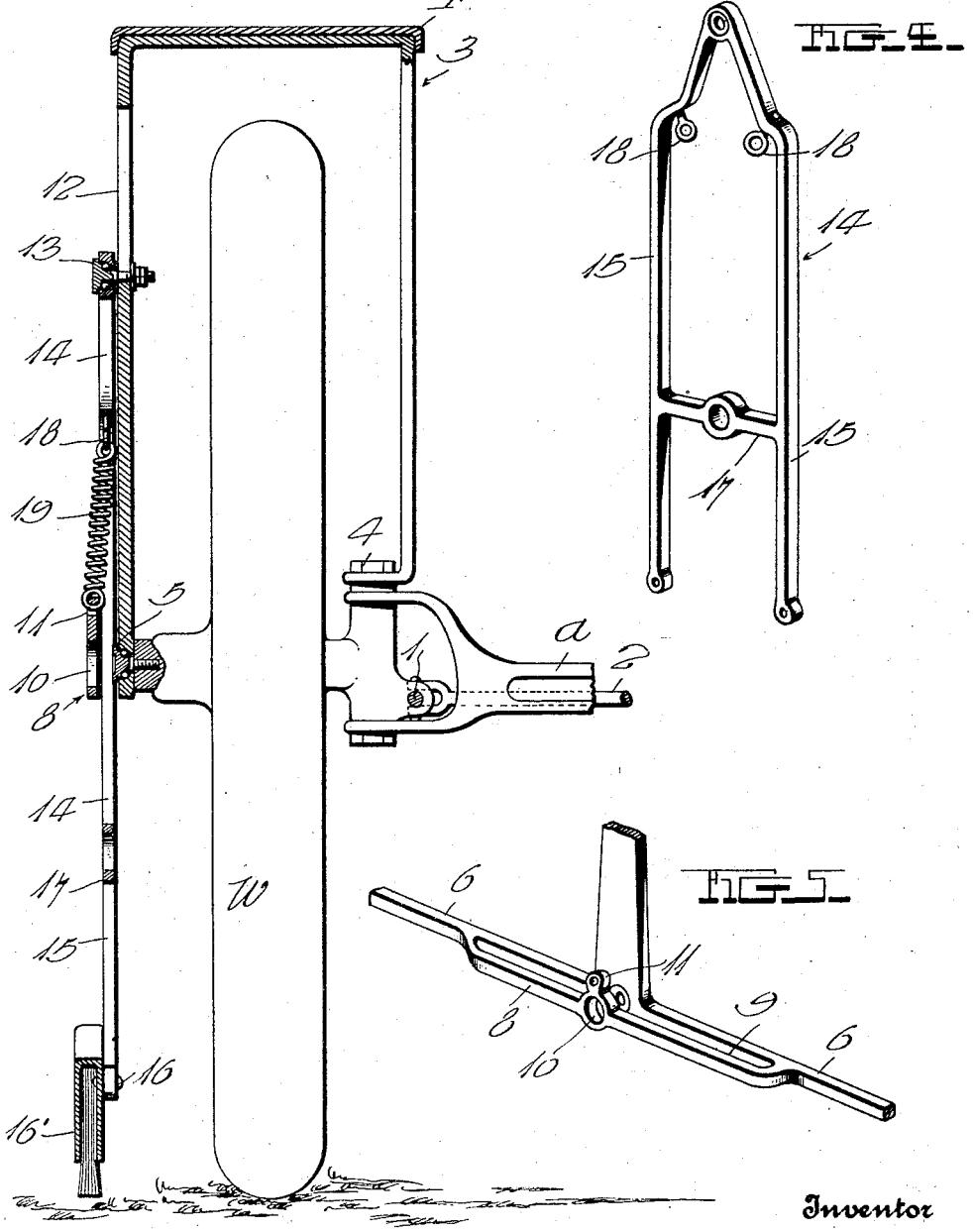

CHARLES W. BROWN, OF BOSTON, MASSACHUSETTS.

SIDE-SPLASH GUARD.

1,341,008.   Specification of Letters Patent.   Patented May 25, 1920.

Application filed December 15, 1919. Serial No. 344,843.

*To all whom it may concern:*

Be it known that I, CHARLES W. BROWN, a citizen of the United States, residing at Boston, in the county of Suffolk and State of Massachusetts, have invented certain new and useful Improvements in Side-Splash Guards; and I do declare the following to be a full, clear, and exact description of the invention, such as will enable others skilled in the art to which it appertains to make and use the same.

This invention relates to improvements in side splash guards for automobile wheels, etc.

The primary object is to provide a simple and practical device of this character which will be automatically retained in operative position, or, should it strike an obstacle which moves it from the vertical position, it will quickly return to its vertical or operative position.

With the above and other objects in view the invention consists of certain novel features of construction and the combination and arrangement of parts as will be more fully described and claimed.

I attain these objects by constructing the guard as illustrated in the accompanying drawing, in which—

Figure 1, is a side elevation of a wheel with the guard applied thereto;

Fig. 2, is a section taken on the line 2—2 of Fig. 1;

Fig. 3, is a section taken on the line 3—3 of Fig. 1;

Fig. 4, is a detail perspective view of the shield or guard carrying frame, and

Fig. 5, a detail perspective view of the guide slot carrying arm.

Similar reference numerals designate similar parts throughout the several views.

Reference is now had to the drawings in which the guard is shown applied to an automobile W, over which is positioned a fender F, said fender being curved to conform to the curvature of the wheel and mounted to change its relative position to the machine with every change of the wheel's relative position. The wheel is provided with the usual hub which carries on its inner end a steering knuckle through which the king pin is passed to connect it to the forked end of the axle A. To assure positive change of position of the fender with the wheel, I provide a longitudinally extending bar 1 which is suitably connected to the steering knuckle and has its ends secured to the inner opposite edges of the fender F. The tie bar 2 has its ends secured to the other bars 1 at points in the rear of the axle A, to provide means to permit changing the direction of travel of the wheels.

Straddling the upper side of the wheel W is a substantially U-shaped supporting frame 3, the inner arm of which is bent laterally and apertured to receive the usual king pin 4 which secures said arm in place. The outer arm extends downwardly to a point adjacent the wheel hub, to the outer end of which the arm is secured by a screw 5. The screw passes through an opening in said arm, said opening and the enlarged head of the screw being formed to provide a space for ball bearings, said screw and its head being adapted to rotate in said opening. A pair of oppositely directed horizontally disposed arms 6 is formed integral with the lower end of the outer arm, said arms 6 having their outer free ends 7 bent laterally inward and provided with ears to be attached to the inner face of the adjacent bar 1 as shown in Fig. 2.

Formed integral with or welded to the arms 6 is a short bar 8 which extends parallel with and is spaced from said arms to provide a horizontally extending guide slot 9. Substantially midway its length the bar 8 is increased in width and provided with an opening through which the screw 5 is passed to secure the arm to the hub of the wheel. An apertured boss or lug 11 is formed on the enlarged portion of the bar 8, for a purpose about to be set forth.

The outer arm of the U-shaped frame is provided near its upper end with a vertical slot 12, in which is slidably mounted a bolt 13 carried by the upper end of a substantially rectangular open frame 14. The frame 14 comprises a pair of parallel spaced side bars 15 whose upper ends are so connected as to form a substantially inverted V-shape whose apex is apertured to receive the bolt 13 by which the frame is secured to the first named frame 3. The lower end of the frame 14 is open and the arms are apertured near their lower ends to receive rivets or bolts 16 which are employed to secure a shield 16' shown in the form of a flat brush whose back is substantially inverted U-shape in cross section. The side bars 15 of the frame are held in proper relative position by means of a cross bar 17 as shown in Fig. 4.

At the juncture of the side bars 15 and the inverted V-shaped upper end are secured eye screws 18 or the like, to which are secured the upper ends of a pair of coil springs 19. The other or lower ends of the coil springs are secured in the heretofore described boss or lug 11, thus forming a yieldable connection between the shield carrying frame 14 and the supporting frame 3.

The shield or brush supporting frame 14 is positioned in the guide slot 9, which limits the swinging movement of the brush carrying frame. The slot and bolt connection between the two frames, provides a slidable and pivotal connection, and, due to the action of the coil springs, the frame is normally yieldably held in a vertical position with the shield or brush positioned at the lowermost points. It is readily seen that, when in use, should the brush strike an obstacle it will be swung on the pivot formed by the bolt or screw 13 and pass over said obstacle, after which, the spring will act to return the brush to its normal operative position. Due to the manner in which the entire device is mounted on the wheel it will always be positive in its action.

From the foregong description taken in connection with the accompanying drawing the construction and operation of the invention will be readily understoood without requiring a more extended explanation.

Various changes in the form proportion and minor details of construction may be resorted to without departing from the principle or sacrificing any of the advantages of the claimed invention.

I claim:

1. A side splash guard for automobile wheels including a substantially U-shaped frame adapted to straddle the upper side of a wheel, said frame having a horizontal guide slot in the lower portion of its outer arm, a second frame, said second frame being pivoted to and vertically slidable on the outer arm of said U-shaped frame, said second frame being extended through the guide slot and having its lower end disposed adjacent the lower side of the wheel, means connecting said frames to yieldably retain the second frame in vertical position with its lower end in its lowermost position and a shield mounted on said lower end.

2. A side splash guard for automobile wheels comprising an inverted substantially U-shaped supporting frame adapted to straddle a wheel, a pair of oppositely directed horizontally disposed arms formed on the lower end of the outer arm of said frame, a bar connecting said horizontal arms, said bar extending parallel with and spaced from said arms to form a guide slot, a second frame, said second frame being pivoted to and vertically slidable on the outer arm of the supporting frame, said second frame being received in said guide slot to limit its swinging movement, a shield secured to the lower end of said second frame, and means connecting the two frames to normally retain the shield adjacent the ground and yieldably retain the second frame in substantially vertical alinement with the first frame.

3. The combination with an automobile wheel and a fender shiftable transversely therewith; of a substantially U-shaped horizontally disposed bar having its arms secured to the fender, a second bar extending parallel with and spaced from the outer face of said bar to provide a guide slot intermediate the ends of said U-shaped bar, a substantially U-shaped frame straddling the upper side of the wheel and having its outer arm secured to said U-shaped bar, a second frame, said second frame being pivoted to and vertically slidable on the outer arm of the U-shaped frame, said second frame being disposed in said guide slot and extending to a point adjacent the ground, a shield carried by the lower end of said second frame and means connecting said frames to yieldably retain the second frame and shield in vertical operative position.

In testimony whereof I have hereunto set my hand.

CHARLES W. BROWN.